W. T. SPROUSE.
Tire-Tightener.
No. 228,135.   Patented May 25, 1880.
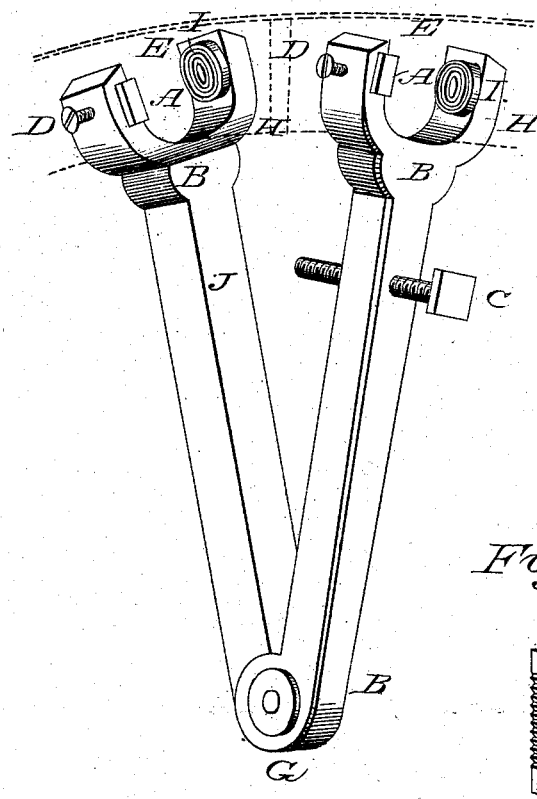
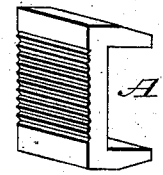

UNITED STATES PATENT OFFICE.

WILLIAM T. SPROUSE, OF BLUE RAPIDS, KANSAS.

TIRE-TIGHTENER.

SPECIFICATION forming part of Letters Patent No. 228,135, dated May 25, 1880.

Application filed August 8, 1879.

*To all whom it may concern:*

Be it known that I, WILLIAM T. SPROUSE, of Blue Rapids, in the county of Marshall and State of Kansas, have invented a new and useful Improvement in Wheel-Tire Tighteners, of which the following is a specification.

My invention relates to devices for the eccentric expansion of vehicle-wheels.

It consists of a vise provided with arms extending from a common axis, and jaws adapted to fit against and clamp two sections of a felly, so that when said arms are operated by means of an expanding screw an eccentric movement will be given to said sections to fill up the space left by the expansion of the tire or the shrinkage of the wooden portion of the wheel.

It consists, also, of certain bearings made adjustable within the jaws of the vise, adapted and arranged to take a firm hold against the vertical sides of the felly-sections previous to expanding them.

In my drawings, Figure 1 is a perspective view, showing the vise applied to two sections of a felly. Fig. 2 is a perspective view of one piece of the bearings.

Similar reference-letters indicate like parts in all of the figures.

Referring to drawings, J J are arms jointed together with a hinge-joint, as shown, Fig. 1. At their points B these arms expand into U-shaped jaws H H, sufficiently wide to accommodate the felly of any ordinary wheel.

I I are corrugated disks set into the inside of the jaws, as shown, and fixed in place by screws or rivets. The faces of these disks have formed in them concentric grooves, which have annular projections to produce the corrugated surfaces or bearings.

On the opposite sides of the said jaws are the serrated bearings A, which are adjustable laterally in said jaws by means of thumb-screws D, by which arrangement the vise may be clamped to fellies of varying sizes.

In one of the arms J of the vise is set an expanding-screw, C, by means of which said arms may be separated or moved within the limit of their common axis.

In applying my device I place it within the wheel, so that the angle, G, formed by the hinged arms will rest between two of the spokes next to the hub and the jaws on either side of the joint between two of the fellies. By means of the screws D, I adjust the plates A until their bearing-surfaces, together with the corrugated disks I, grasp firmly the two sections of the fellies. Now drive the screw C to further separate the jaws and throw the felly toward the tire of the wheel.

If desirable, the device may be applied to each joint of the felly, and as the joints are opened they may be filled with suitable wedges to keep the sections to their new relations.

Having thus described my invention, what I claim as new, and desire to secure by Letters Patent, is—

In a device for expanding the fellies of a vehicle-wheel, the hinged arms J, provided with jaws E, in combination with plates A, adjustable by means of a set-screw, D, and corrugated disks I, said plates A and disks I being so set in said jaws as to bear, when clamped, upon the vertical surfaces of the fellies, as and for the purpose specified.

WILLIAM T. SPROUSE.

Witnesses:
WM. F. RAYMOND,
JAMES H. MCDOWELL.